Dec. 1, 1959        J. ZALKIND        2,915,234
DEVICE FOR SEPARATING AND SORTING MANIFOLD SETS
Filed Oct. 19, 1955        3 Sheets-Sheet 2
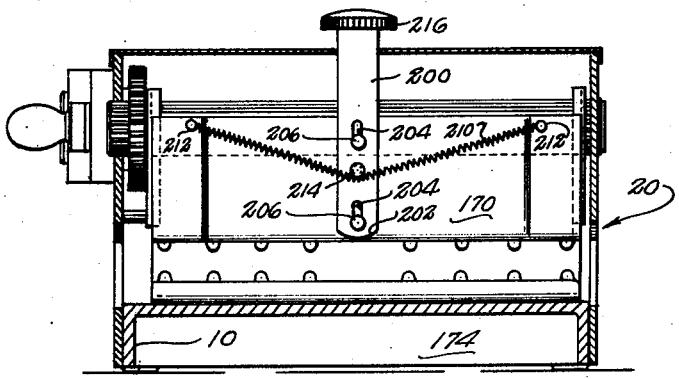
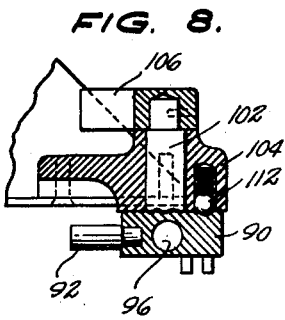
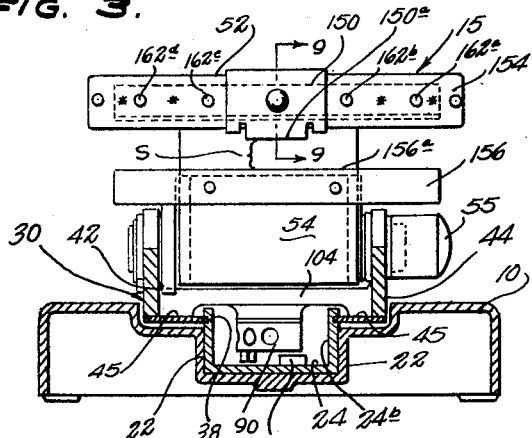
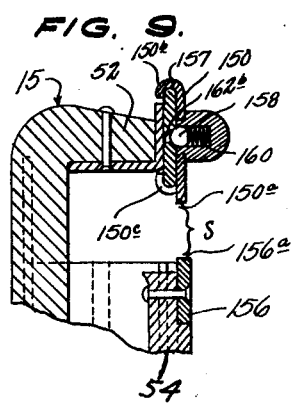
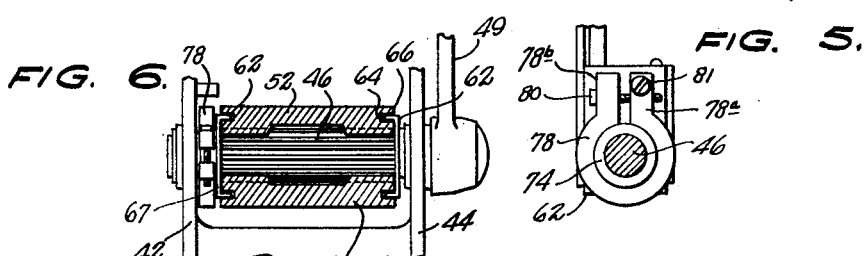
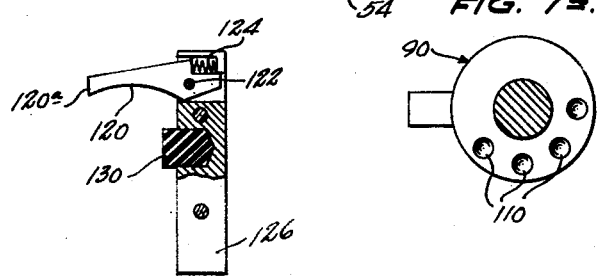
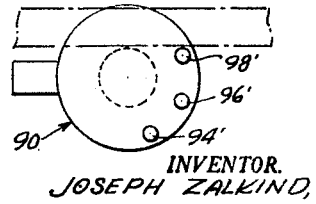
INVENTOR.
JOSEPH ZALKIND,
BY
*Albert M. Zalkind*
ATTORNEY.

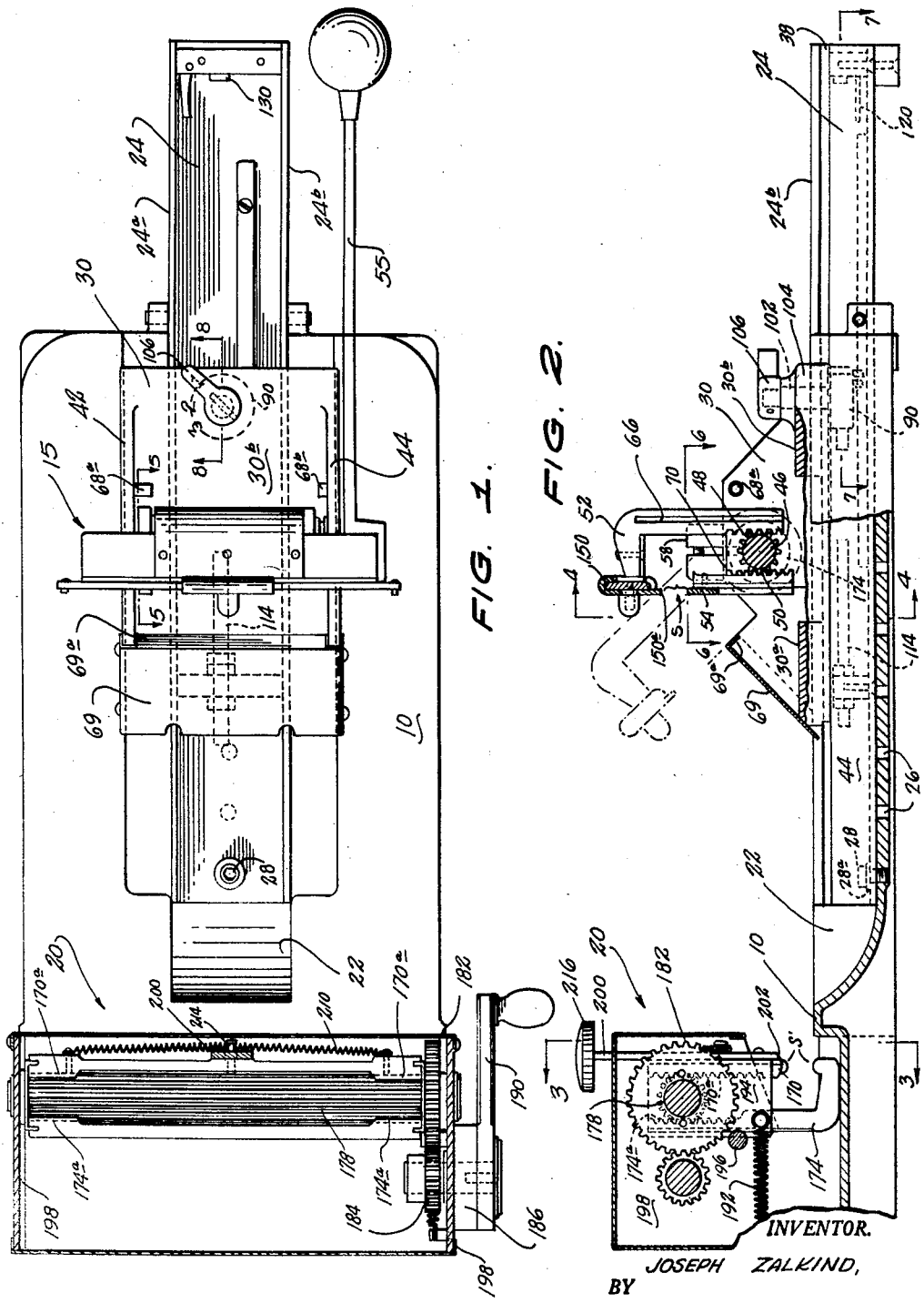

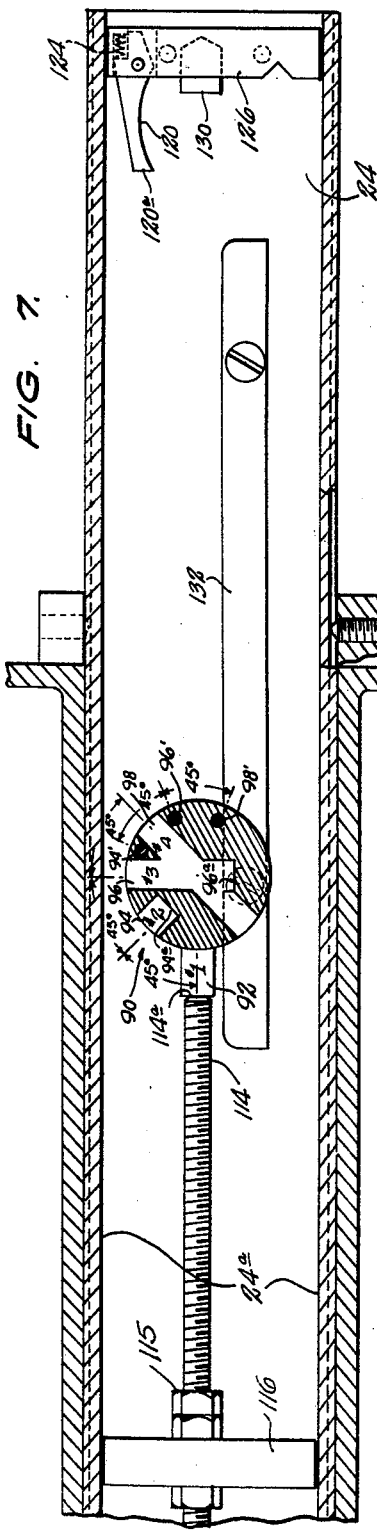

United States Patent Office 2,915,234
Patented Dec. 1, 1959

2,915,234
DEVICE FOR SEPARATING AND SORTING MANIFOLD SETS

Joseph Zalkind, New York, N.Y.

Application October 19, 1955, Serial No. 541,348

7 Claims. (Cl. 225—101)

My invention will now be described in conjunction with the appended drawing, in which:

Fig. 1 is a plan view partially in section;
Fig. 2 is an elevation partially in section;
Fig. 3 is a section through 3—3 of Fig. 2;
Fig. 4 is a section through 4—4 of Fig. 2;
Fig. 5 is a section through 5—5 of Fig. 1;
Fig. 6 is a section through 6—6 of Fig. 2;
Fig. 7 is a section through 7—7 of Fig. 2;
Fig. 7a is a top view of an element of the invention;
Fig. 7b is a bottom view of an element of the invention;
Fig. 8 is a section through 8—8 of Fig. 1;
Fig. 9 is a section through 9—9 of Fig. 4, and
Fig. 10 is an enlarged detail of one of the elements of the device.

Figs. 11 and 12 show various forms of manifold sets adapted for simultaneous separation and sorting with the machine shown in Figs. 1–10.

With reference to the drawing, the invention comprises a base 10 on which are mounted a pair of clamps generally designated as 15 and 20. These clamps are for gripping the top and bottom margins of a stack of manifold sets in the manner taught in my prior patents, for example, Patent No. 2,673,612 granted March 30, 1954 for a Machine for Separating Multiple Interleaved Forms. By virtue of the present state of development of the art, it is not believed necessary to give any detailed description of the basic operation of the present device, since it is substantially the same, insofar as exerting a tensile force is concerned, as disclosed in my prior patent.

The base 10 is shaped with a trough 22 which accommodates a channel element 24 that serves as an adjustable carrier for the clamp 15. The bottom of the trough 22 (Fig. 2) is provided with a plurality of threaded holes 26 for engagement by a suitable bolt 28 passing through a hole 28a in the bottom of the carrier so as to fix the carrier 24 relative to the base 10 in any one of several selected positions depending upon the length of manifold sets to be separated.

The clamp 15 is supported on a slidable carriage 30 having vertical side flanges 42 and 44 (Fig. 4) to which horizontal guide plates 45 may be bolted (bolts not shown) or otherwise secured, which guide plates are thus fastened at the lowermost edges of the side flanges 42 and 44. The inner edges of the guide plates 45 are slidably received in respective grooves 38 in the sides 24a and 24b of the carrier 24. The carriage 30 is preferably a metal casting and as indicated in Fig. 2 is provided with bridging members 30a and 30b which will be understood to be cast integral with the side walls 42 and 44 and intermediate such walls.

An elongated pinion 46 has a suitable bearing support at its opposite ends in the side walls 42 and 44 and such pinion is in engagement with pairs of gear racks 48 and 50 of jaws 52 and 54, respectively, comprising clamp 15. Thus, the jaw 52 may be referred to as the upper jaw while the jaw 54 may be considered to be the lower jaw, and it will be understood that rotation of the pinion 46 by means of a handle lever 55 suitably keyed to the pinion can effect opening and closing of the jaws so as to grip the margin of a stack of manifold sets within the space designated as S. As seen in Fig. 9, the upper jaw has a novel construction for a purpose to be hereinafter described.

It should be noted that the jaws are simultaneously movable to open or close the space S. They are maintained in proper assembly by means of a pair of opposed flanged plates 62, as shown on Fig. 6, which have inturned flanges, such as 64, slidably carried in grooves such as 66 provided in the lateral edges of the jaws. Thus, the sides of the jaws are provided with grooves coacting with flanges on the plate so that the plates serve as guides to effect parallel motion of the jaws 52 and 54 as pinion 46 is rotated. The guide plates 62 are provided with bores 67 through which the elongated pinion 46 passes so that such guide plates are supported on the pinion shaft and the pinion can rotate with respect to the guides and serves as a support for clamp 15. Further, the clamp 15 can rock about the pinion 46, within limits set by studs 68a and b and a rest plate 69 having an abutment ledge 69a engageable by jaw 54.

As shown on Fig. 2, the racks 48 and 50 occur in pairs along the sides of the respective jaws 52 and 54. Thus, a space intermediate the racks is provided for a stud 70 carried by the jaw 54, which stud can directly engage the pinion 46 so as to preclude opening of the space S beyond a predetermined degree, for example, as seen in Fig. 2.

At one end of the pinion 46 a surrounding brake collar 74 is integrally fastened to the inside of the wall 42 in any suitable manner and thus the pinion 46 revolves inside the collar. Surrounding the collar is a brake yoke element 78 which can be caused to grip the collar with a predetermined degree of rotative friction by means of an adjusting screw 80 which passes through extended legs 78a and b of the yoke as shown on Fig. 5. The yoke may be made of any suitable material having sufficient flexibility to effect tightening on collar 74. For example, either fiber or metal has been found suitable. The leg 78a is fastened by means of a screw or bolt 81 to the adjoining guide plate 62, as shown in Fig. 5, and accordingly it will be apparent that the amount of torque necessary to rotate pinion 46 is determined by the degree of tightening of screw 80 which controls the grip of the yoke 78 on the fixed collar 74. In this manner, a certain degree of resistance to rotation is provided for the clamp 15 so that it will hold in position in abutment with ledge 69a while the jaws 52 and 54 are being clamped to the margin of a manifold stack by rotation of handle 55.

The pinion 46 may be rotated counterclockwise as viewed on Fig. 2 (by means of handle 55) to open the space S and at the same time to swing clamp 15 until jaw 54 engages ledges 69a. Thus, the superimposed margins of a stack of manifold forms are inserted in the space S which is subsequently diminished by clockwise rotation of handle 55 so as to grip; further rotational force on the handle causing the clamp 15 to rotate bodily with pinion 46 in a clockwise direction following the motion of the handle, and this bodily rocking effects the strong tension which pulls the writing sheets away from the carbon sheets, all as in a manner well understood from my previously mentioned patent, it being understood that the opposite margin of the stack is received in clamp 20 to be hereinafter described.

From the above description thus far given it will be apparent that the clamp 15 can slide back and forth on the channel 24 which is fixed to base 10, by virtue of the sliding fit between plates 45 and grooves 38. Thus, when a stack edge is gripped, the clamp being then in the position indicated by the dot-dash line, the pinion 48 is rotated clockwise rotating clamp 15 therewith. After the sheets gripped in the clamp are pulled away at the perforate lines which are understood to be at the opposite margin of the stack adjacent clamp 20 which clamps the stubs of the sets, continued pressure on handle 55 will cause carriage 30 and the sheets carried in clamp 15 to slide to the right as viewed on Fig. 2. This serves to further separate the severed sheets from the remainder of the stack and is an important feature of my invention for the purpose of simultaneously sorting the several sheets which make up a manifold set as will be made apparent.

In a copending application, Serial No. 494,831, filed March 17, 1955 and now abandoned, I show and describe various novel manifold sets having registering staggered or indexed gripping areas intended particularly for use with the device described herein.

The copending application shows manifold sets (Figs. 11 and 12 herein) wherein all the registering indexed areas of a series of sheets which correspond to each other are superimposed. For example, all the duplicate sheets of a stack of manifold sets have certain superimposed areas which can be simultaneously gripped as a group. This selective gripping occurs successively; thus, depending on the arrangement of the indexing, all top sheets can be pulled simultaneously from their respective sets as a group. This isolates the gripping areas of the duplicate sheets and all duplicates can then be gripped and pulled as a group, etc. Similarly, with another form of indexing all bottom sheets would be first pulled, isolating the gripping areas of the next to the bottom sheets of the several sets so that they can then be gripped and pulled. In this manner by successive pulling all the corresponding sheets of a stack are sorted in groups as they are pulled from the stack.

The present invention provides means for accomplishing the gripping of proper areas successively and quickly and with any of the several modes of providing registering indexed areas shown in my copending application. Thus, assume the mode of providing gripping areas is an arrangement wherein each sheet of a set, starting at the bottom is, perhaps, ⅜" longer than the superimposed sheet (Fig. 11), my invention in this application effects automatic means for positioning clamp 15 progressively forward, i.e., in the direction of clamp 20, so as to grip and pull successive groups of corresponding sheets, as described above, in a series of repeated operations, starting with the group consisting of the lowermost sheet of each set of the stack and finishing with the group consisting of the uppermost. It will be apparent that the bottom margins of all the bottom sheets of a plurality of stack of manifold sets which would be adjacent clamp 15 could be gripped within the area provided by the ⅜" excess length, without gripping any of the superimposed sheets of any of the sets in the stack. Accordingly, all such bottom sheets of several sets may be pulled out of the stack of sets simultaneously. In other words, they are separated in a group, e.g., all the quadruplicates are thus removed. Subsequently, the bottom edges of the next superimposed sheets being now exposed, they are gripped, and all triplicate sheets pulled from the stack. The duplicate sheets are then pulled, leaving only the originals still fastened to the stubs of the sets understood to be held in clamp 20, along with the carbon sheets. The final operation would pull all the originals, leaving only the stub and carbon sheets in clamp 20.

Referring now to the drawing, Figs. 1, 2, 4, 8 and 10, the carriage 30 carries a cam element 90 which has a stud 92, blind bores 94 and 96 and a throughbore 98 as shown in section in Fig. 7, effecting a series of steps.

The cam element 90 (Figs. 2 and 8) has a post 102 secured to the top surface which post serves to carry the cam on a shelf 104 which is integral with carriage 30. The upper end of post 102 has a pointer indicator 106 secured thereto which can point to the numbers "1," "2," "3," "4" raised on the surface of shelf 104 (Fig. 1).

Cam 90 is rotatable to any of four positions as indicated by the numerals "1," "2," etc., and has a detent means comprising four sockets 110 (Figs. 7a and 8) on its top surface to take a spring pressed ball 112. Thus the cam 90 can be indexed to any of four positions which are disposed 45° apart so as to align any of the predetermined abutment elements such as stud 92 or the bottoms of blind bores 94 and 96 or throughbore 98 with a bolt 115 (Fig. 7) carried by a bridging member 116 between the sides 24a of channel 24.

The bottom of the cam is provided with three fixed studs (Fig. 7b) designated as 94', 96', 98' to indicate correspondence with the abutment elements 94, 96, 98, respectively. These studs are successively engageable with a finger 120, at edge 120a, carried at the end of channel 24, Fig. 7. As shown in Fig. 10, the finger 120 is pivoted at 122 and biased by a shock absorbent spring 124, the construction being mounted in a bridging element 126, secured to channel 24, and the bridging element having a rubber bumper button 130.

A strip of metal such as cleat 132 is fastened to the bottom of channel 24 to serve as a limit for rotation of cam element 90 wherein stud 94' or 98' will engage cleat 132 in either extreme rotated position of the cam element.

Assuming the cam is manually rotated to bring the pointer 106 over "1" (Fig. 1) the stud 92 will point toward bolt 114 and when the carriage is slid to the left, stud 92 strikes the protruding end 114a of bolt 114 to stop the carriage at a distance from clamp 20 as determined by the length of stud 92. Thus clamp 15 is positioned to grip all papers of a particular length in each of a stack of manifold sets, for example all sheets #1 of a plurality of sets, each having four sheets staggered ⅜" to ¾". One such set is shown in Fig. 11 and it will be understood to have foreshortened carbons. Accordingly, all #1 sheets can be gripped in clamp 15 by rotation of handle 55, and pulled from their respective stubs by rotation of clamp 15; continued pressure on handle 55 will cause carriage 30 to slide rearwardly so that stud 94' engages the edge 120a of finger 120 which serves to rotate cam 90 (and indicator 106 to position #2) some 45°, so as to bring socket 94 into alignment with bolt 114, just prior to cam 90 striking the limit button 130. The button 94a of the socket 94 is then positioned to engage the bolt end 114a to set clamp 15 at the proper position to grip all #2 sheets when clamp is shifted forward towards the manifold stack. Indexing to position #3 takes place in the same way, stud 96' being actuated by finger 120 to set clamp 15 to grip all #3 sheets by engagement of socket end 96a with the bolt end 114a. Thence, rearward movement of the carriage effects indexing by engagement of stud 98' with finger 120 to bring throughbore 98 into alignment with the bolt. However, in this instance the carriage, on leftward travel, is stopped by nut 115 striking the cam body since the bolt 114 can pass through bore 98. The engagement of the cam body with the nut disposes clamp 15 to grip all #4 sheets.

This construction is provided to enable clamp 15 to be movable by adjustment of nut 115 as close as possible to clamp 20 in the event that the machine is to be used with very short manifold sets without cam indexing.

From the above description it can be seen that stacks of quadruplicate sets may be separated from their carbons and automatically sorted at the same time, all first sheets being pulled simultaneously, then all second sheets, etc.

Another arrangement for automatic separation from carbons and simultaneous sorting is provided for in conjunction with manifold sets of a type shown in Fig. 12 which have stepped notches of increasing length. Thus, sheet #1 has no notch; sheet #2 has a notch of, say 1" length; sheet #3 has a 2" notch; sheet #4 has a 3" notch. The notches may be ⅜" to ¾" deep from the leading edges. For stacks thus indexed I provide a gripping element 150 (Figs. 4 and 9) having an edge 150a which protrudes so as to engage edge 156a of a bar 156 (Fig. 2) carried by jaw element 54.

Jaw 150 is slidably carried on a bar 157 (Fig. 9) and has a curled edge 150b and curled integral straps 150c which ride the opposite edges of bar 157. A spring biased detent ball 158 carried in a knob 160 peened to jaw 150 is provided so that the jaw can be manually slid transversely of clamp 15 to align with any step in the indexed edge array of sets such as shown in Fig. 12. Detent sockets 162a—c (Fig. 4), four in number, are provided in bar 157 to hold ball 158 in any respective position so that edge 150a is aligned with a particular notch in the paper sets.

In using the above construction it is merely necessary to set jaw 150 to the detent 162a position, so as to grip all sheets #1 by rotating handle 55 to cause protruding edge 150a to clamp the #1 sheets against the respective end of edge 156a. Continued rotation of handle 55 rotates clamps 15, and bars 154 and 156 therewith to pull out all #1 sheets. Then jaw 150 is manually slid to the next detent position, 162b, etc., to grip all #2 sheets, thence to 162c position for all #3 sheets and finally to 162d position for all #4 sheets, each set of first sheets, second sheets, etc., being pulled simultaneously.

The clamp 20 will now be described in suitable detail to fully explain a very important novel feature of the invention. This clamp is generally similar in many respects to that shown in my prior patent, incorporating jaws (Figs. 1–3) 170 and 174 which grip the studs of the stacks to provide reaction against the pull of clamp 15. The jaws are provided with spaced racks 170a and 174a actuated by an elongated pinion 178 which is keyed to a gear 182 rotated by a pinion 184 thru a locking device 186 used in conjunction with handle 190. A spring 192 biases, for initial holding purposes, the jaw assembly, via side guides 194 (similar to flanged side guides 67 on clamp 15) against a rotation limit stud 196 which is integral with a casing wall 198 secured to base 10. Two such walls 198 are used to mount the assembly of clamp 20 on base 10.

Carried on the front face of jaw 170 is a plunger or breaker bar 200 having a beveled lower edge. The plunger is slidably carried by virtue of slots 204 in which ride headed studs 206 integral with jaw 170.

A tension spring 210 engages a stud 214 on the plunger to bias it upwardly, the ends of the spring being fastened to jaw 170 at studs 212. The plunger has a knob 216 at its upper end which can be struck or pressed to cause edge 202 to strike the stack being separated on or adjacent the perforation. The beveled edge need not be sharp; I have found that if the plunger be depressed after the stack is placed in tension between clamps 15 and 20 the local stress at (or on either side of) the perforate line has a surprisingly marked effect in reducing the force required on handle 55 to cause separation of the sheets from the stub.

In the course of experiments I have found that the width of the plunger is not particularly critical nor is the sharpness of the edge. I believe that the force exerted by the plunger at (or near) the perforate line effects the commencement of tearing of the perforate lines of the stack. Once such tearing is commenced it spreads rapidly in both directions to the ends of the line, much less pulling force of clamp 15 being required due to the initial tearing as produced by plunger 200 after the stack is in tension.

Thus by virtue of the addition of plunger 200 I am enabled to provide a machine which is capable of separating thicker stacks of manifold sets than has heretofore been possible.

Having described my invention, I am aware that various changes may be made without departing from the spirit thereof and accordingly I do not seek to be limited to the precise illustration herein given except as set forth in the appended claims.

I claim:

1. A device of the class described comprising a pair of spaced clamps, one of said clamps being movable towards or away from the other of said clamps and having positionable jaw means for selectively gripping registering indexed portions of sheets of a stack of manifold sets, including positioning means for positioning said jaw means at predetermined positions registering with respective indexed portions of said sheets, said positioning means including a stationary abutment element and a plurality of selectively positionable abutment elements carried by said jaw means for engaging said stationary element to position said jaw means.

2. A device of the class described comprising a pair of spaced clamps, one of said clamps being movable towards or away from the other of said clamps and having positionable jaw means for selectively gripping registering indexed portions of sheets of a stack of manifold sets, including positioning means for positioning said jaw means at predetermined positions registering with respective indexed portions of said sheets, said positioning means comprising a gripping element, as part of said jaw means, selectively positionable in a path substantially transverse to the direction of motion of force applied by said jaw means.

3. A device of the class described comprising a pair of spaced clamps, one of said clamps being movable towards or away from the other of said clamps and having positionable jaw means for selectively gripping registering indexed portions of sheets of a stack of manifold sets, including positioning means for positioning said jaw means at predetermined positions registering with respective indexed portions of said sheets, said jaw means being rockable to effect tearing of perforations of a group of sheets and reciprocal to effect removal of said group from said stack, said positioning means including a stationary abutment element and a plurality of selectively positionable abutment elements carried by said jaw means for engaging said stationary element to position said jaw means.

4. A device of the class described comprising a pair of spaced clamps, one of said clamps being movable towards or away from the other of said clamps and having positionable jaw means for selectively gripping registering indexed portions of sheets of a stack of manifold sets, including positioning means for positioning said jaw means at predetermined positions registering with respective indexed portions of said sheets, said jaw means being rockable to effect tearing of perforations of a group of sheets and reciprocal to effect removal of said group from said stack, said positioning means comprising a gripping element, as part of said jaw means, movable to selective variable positions in a path substantially transverse to the direction of motion of force applied by said jaw means.

5. A device as set forth in claim 1, including a base, said jaw means being reciprocal on said base, said stationary abutment element being carried by said base, said selectively positionable abutment elements comprising a cam having surfaces alignable with said stationary abutment element for engagement therewith, said surfaces being at progressively varying distances during the course of successive alignment with said stationary element to dispose said jaw means at predetermined positions.

6. A device as set forth in claim 5, said cam being rotative, and co-acting actuating means carried by said cam and said base for indexing said cam to align said cam surfaces successively with said stationary element each time said jaw means is reciprocated on said base.

7. A device for separating a stack of manifold sets wherein the writing sheets of said sets are provided with weakened lines for separation from a stub to which said sheets are secured, comprising a pair of spaced clamps, one of said clamps being movable away from the other of said clamps to effect tension in said stack and to pull said sheets away from said stub, and a breaker element carried by the other of said clamps and disposed for downward movement for exerting a rupturing force on said sheets substantially in the vicinity of said weakened lines while said sheets are held in tension between said clamps, said breaker element comprising a substantially blade-like member having a lower end adapted to engage said sheets and an upper end disposed to be manually pressed.

References Cited in the file of this patent
UNITED STATES PATENTS

| | | |
|---|---|---|
| 1,134,293 | Stevens | Apr. 6, 1915 |
| 1,894,065 | Sherman et al. | Jan. 10, 1933 |
| 2,331,351 | Seeley | Oct. 12, 1943 |
| 2,513,093 | Hageman | June 27, 1950 |
| 2,579,835 | Luther | Dec. 25, 1951 |
| 2,600,042 | Wright | June 10, 1952 |
| 2,684,717 | Jones | July 27, 1954 |
| 2,711,793 | Zalkind | June 28, 1955 |
| 2,730,174 | Weinstein | June 10, 1956 |